United States Patent [19]
Tomizawa et al.

[11] Patent Number: 5,387,370
[45] Date of Patent: Feb. 7, 1995

[54] ELECTROVISCOUS FLUID

[75] Inventors: Hirotaka Tomizawa; Makoto Kanbara; Tetsuo Miyamoto, all of Ohi, Japan

[73] Assignee: Tonen Corporation, Tokyo, Japan

[21] Appl. No.: 30,022

[22] PCT Filed: Jul. 24, 1992

[86] PCT No.: PCT/JP92/00944
§ 371 Date: Mar. 24, 1993
§ 102(e) Date: Mar. 24, 1993

[87] PCT Pub. No.: WO93/02166
PCT Pub. Date: Feb. 4, 1993

[30] Foreign Application Priority Data

Jul. 24, 1991 [JP] Japan ................. 3-184496
Dec. 26, 1991 [JP] Japan ................. 3-344922
Dec. 26, 1991 [JP] Japan ................. 3-344924

[51] Int. Cl.$^6$ ............ C09K 19/52; C09K 5/00; H01B 3/24
[52] U.S. Cl. ............ 252/299.01; 252/73; 252/74; 252/75; 252/570; 428/1
[58] Field of Search ........ 252/299.01, 73, 74, 252/572, 75, 570; 428/1

[56] References Cited

U.S. PATENT DOCUMENTS

| | | | |
|---|---|---|---|
| 5,075,023 | 12/1991 | Fukuyama et al. | 252/74 |
| 5,087,382 | 2/1992 | Ishino et al. | 252/73 |
| 5,160,451 | 11/1992 | Eidenschink | 252/299.01 |

FOREIGN PATENT DOCUMENTS

| | | |
|---|---|---|
| 0291338 | 11/1988 | European Pat. Off. |
| 0395359 | 10/1990 | European Pat. Off. |
| 0478034 | 4/1992 | European Pat. Off. |
| 58-187492 | 11/1983 | Japan . |
| 62-241995 | 10/1987 | Japan . |
| 02503326 | 10/1990 | Japan . |
| 2199336 | 7/1988 | United Kingdom . |
| 9200469 | 1/1992 | WIPO . |

*Primary Examiner*—Shean Wu
*Attorney, Agent, or Firm*—Armstrong, Westerman, Hattori, McLeland & Naughton

[57] ABSTRACT

Electroviscous fluid according to the present invention is used for vibration control machines and devices such as variable damper, engine mount, bearing damper, clutch, valve, shock absorber, precision machine, accoustic machine, etc. and for display element. It has high electroviscous effect and wider application temperature range, and the electroviscous effect is stable.

6 Claims, No Drawings

ELECTROVISCOUS FLUID

TECHNICAL BACKGROUND

The present invention relates to an electroviscous fluid for electrically controlling vibration control machines and devices such as variable damper, engine mount, bearing damper, clutch, valve, shock absorber, precision machine, accoustic machine, etc. and also for display element.

BACKGROUND TECHNIQUE

Electroviscous fluid, in which viscosity of fluid changes when voltage is applied, has been known since many years. Early study on electroviscous fluid was concentrated on a system containing liquid only, while electroviscous fluid of solid dispersion system was developed by Winslow et al.

In such electroviscous fluid, solid particles, polarizing agent, etc. are dispersed in electrically insulating fluid such as mineral oil, synthetic oil, etc., and it is necessary to uniformly disperse solid particles in the electrically insulating fluid to obtain the effect. Even when dispersing agent is used, solid particles are likely to precipitate and this often leads to the decrease of electroviscous effect and unstable property and also to obstruction of various parts of machines. Also, there are problems such as friction wearing of machine parts and decrease of electroviscous effect at the temperature lower than room temperature.

In the past, it has been reported that electroviscous effect is obtained by azomethine liquid crystal under the presence of electric field (Jpn. J. Appl. Phys. 17 (1978), p. 1525). The present inventors have found, during study on application of liquid crystal as electroviscous fluid for machines devices such as variable damper, engine mount, bearing damper, clutch, valve, shock absorber, etc., and that azomethine type liquid crystal has low electroviscous effect, and the effect is further decreased when it is in contact with atmospheric air, thus being not suitable for the use in machines and devices.

The electroviscous fluid comprising nematic liquid crystal has responsiveness of several to several tens of msec., and much higher responsiveness is required depending upon the machine system where electroviscous fluid is used.

It is an object of the present invention to provide an electroviscous fluid, which has high and stable electroviscous effect and wide application temperature range and is to be used for vibration control machines and devices such as variable damper, engine mount, bearing damper, clutch valve, shock absorber, precision machine, accoustic machine, etc. and also for display element.

DISCLOSURE OF THE INVENTION

The electroviscous fluid of the present invention is used for vibration control machines and devices such as variable damper, engine mount, bearing damper, clutch, valve, shock absorber, precision machine, accoustic machines, and also for display element, and it contains liquid crystal substance as principal component.

The electroviscous fluid of the present invention has liquid crystal substance as principal component, and antioxidant and/or metal corrosion inhibitor are added to it.

Further, the electroviscous fluid of the present invention has nematic liquid crystal substance having positive dielectric anisotropy as principal component.

Also, the electroviscous fluid of the present invention has ferroelectric liquid crystal substance as principal component.

Further, the electroviscous fluid of the present invention has liquid crystal or electrically insulating fluid containing liquid crystal as dispersion medium and has solid particles as dispersoid.

In general, liquid crystal has anisotropy and, despite of the fact that it is liquid, it has crystalline property. Because of its dipole moment, it is oriented in a certain direction under the presence of electric field, and theological change occurs due to particle arrangement. Thus, apparent viscosity is increased. That is, under the presence of electric field, resistance occurs against the flow passing between the electrodes, and molecules are bound to each other by electrostatic attractive force. As the result, higher resistance occurs and this increases viscosity.

However, when electroviscous fluid is used for electric control of machines and devices, it may be brought into contact with atmospheric air at a piston and the like, and it is used at high electric field. If liquid crystal has azomethine bonding, electroviscous effect is low and is decreased when used for a long time. It was also found that liquid crystal having no azomethine bonding had higher electroviscous effect and the effect was maintained even when it was brought into contact with atmospheric air, and it is suitable for the use in machines and devices.

Further, in the conventional type electroviscous fluid containing mineral oil, electroviscous effect is extremely decreased at low temperature, while temperature dependency of viscosity of liquid crystal substance is lower than that of mineral oil. Thus, when liquid crystal is used as electroviscous fluid, good electroviscous effect is maintained even at low temperature, and the application temperature range can be widened.

In the electroviscous fluid for machines and devices, there are problems in that, when high electric field is applied and it is brought into contact with atmospheric air at a piston or the like, electroviscous effect is decreased due to oxidation and deterioration of the liquid crystal and to the elution of electrode metal into the liquid crystal. However, if antioxidant and/or metal corrosion inhibitor is added to the electroviscous fluid, which contains liquid crystal as principal component, it is possible to prevent the decrease of the electroviscous effect.

Further, when the so-called p-type nematic liquid crystal having positive dielectric anisotropy is used the electroviscous fluid having higher thickening effect than n-type nematic liquid crystal can be obtained. Although detailed reason is not known, as the dielectric constant is higher in a direction parallel to molecular axis, electrostatic attractive force becomes stronger than that of n-type nematic liquid crystal when an electric field is applied. As the result, it appears that higher resistance occurs against flow of fluid between the electrodes and this may lead to the increase of viscosity.

Ferroelectric liquid crystal is an electroviscous fluid having an extremely high responsiveness. The ferroelectric liquid crystal has spontaneous polarizing property as high as $3 \times 10^{-9}$ C/cm$^2$ or more. Under the presence of an electric field, its driving force is very high, and the response time can be shortened to less than 1 msec. This contributes to the implementation of a very high responsive device.

Further, if electroviscous fluid contains liquid crystal or electrically insulating fluid containing liquid crystal as dispersion medium and contains solid particles as a dispersoid, thickening effect can be increased more compared with the electroviscous fluid of conventional type, in which solid particles are dispersed in electrically insulating fluid without liquid crystal. The details of this mechanism is not known, but it seems that the electroviscous effect due to orientation of the liquid crystal itself is added to the electroviscous effect based on electric double layer formed on the solid particles, and this may enhance the effect. In particular, in the electroviscous fluid using the conventional type electrically insulating fluid without containing liquid crystal, the electroviscous effect is extremely decreased at the temperature lower than room temperature. If liquid crystal is used, the electroviscous effect can be maintained even at low temperature, and the electroviscous fluid has very wide application temperature range.

BEST MODE FOR CARRYING OUT THE INVENTION

The liquid crystal usable in the present invention is a liquid crystal substance, which does not have azomethine bonding (-CH=N-bonding) in structural formula, and is expressed by the following formulae (1) and (2):

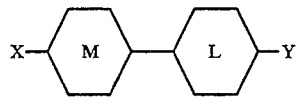
(1)

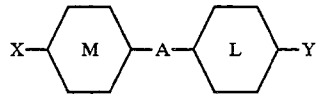
(2)

In the formulae (1) and (2), M and L represent:

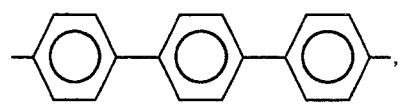

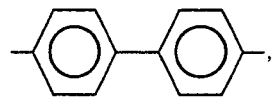

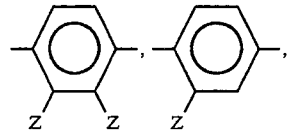

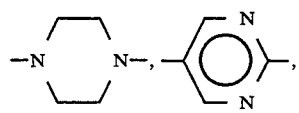

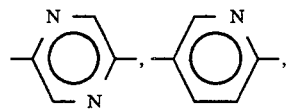

-continued

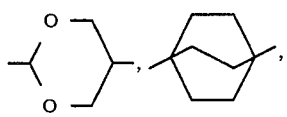

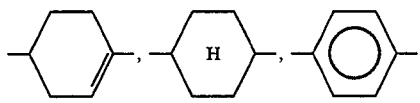

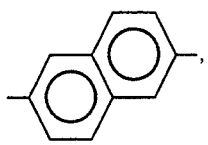

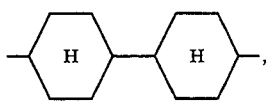

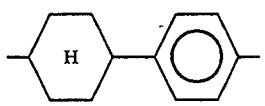

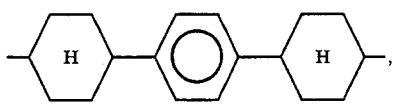

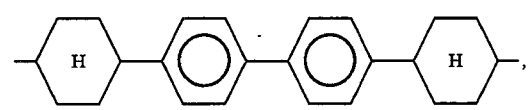

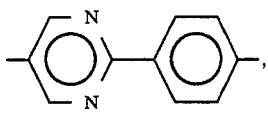

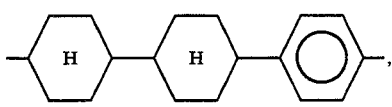

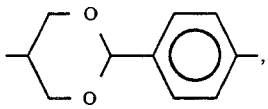

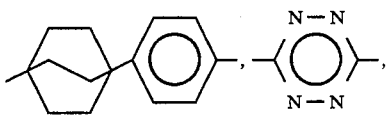

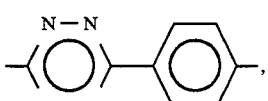

-continued

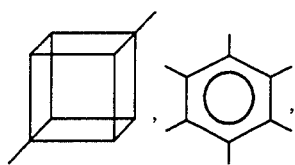

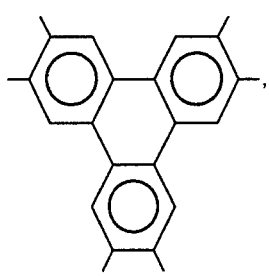

and A represents:

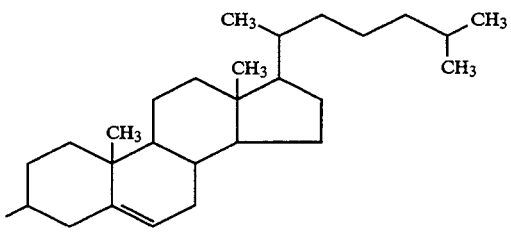

—CH=CH—(trans), —N=N—, —CH=N—,
             ↓        ↓
             O        O

—C≡C—, —N=N—(trans), —COO—,

—(CH₂)ₙ—, —CH₂O—, —R'—, —COS—,

—CH=C(CN)—, —CH=C(Cl)—,

—COCH₂—, —O—(CH₂)₂—O—,

—CH=CH—COO—, —COO—C₆H₅—COO—,

X, Y: —C₆H₅, —NHCOCH₃, —CN, —OR,

—NO₂, —F, —Cl, —Br, —NR₂, —R, H,

—OCOR, —COOH, —CHO, —NCS, —N₃,

—NH₂, —CH₂CH(Cl)CN,

—C(CH₃)=NOH, —COR, —C≡CH,

—CH₂COOH, —NCO, —R'CN, —R'Cl,

—R*, —ROR*, —OCOOR

In the above, R represents $C_nH_{2n+1}$, or

C₂H₅—CH(CH₃)—CH₂—,

C₂H₅—CH(CH₃)—CH₂O—,

C₂H₅—CH(CH₃)—C₃H₆—, $R^1$ is $C_nH_{2n}$,

R* is an optically active alkyl group,

Z and Z' are cyano group, fluorine atom, chlorine atom, iodine atom, bromine atom, nitro group, and methyl group, and n in R and R' represents an integer of 1 to 20, and the number of carbon atoms in R is the same as in R and R'.

As the liquid crystal given by the above formulae (1) and (2), there are the substances given by the following structural formulae:

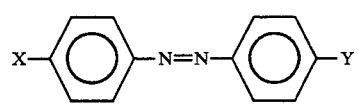 (3)

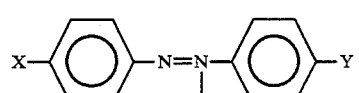 (4)

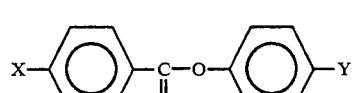 (5)

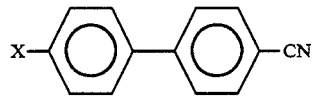 (6)

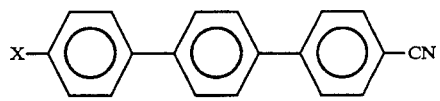 (7)

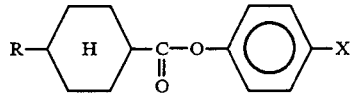 (8)

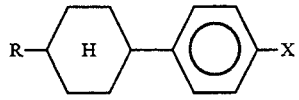 (9)

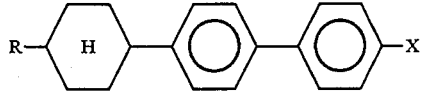 (10)

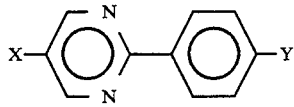 (11)

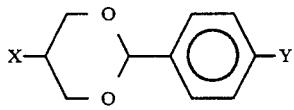 (12)

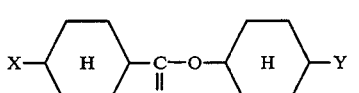 (13)

-continued

(14) 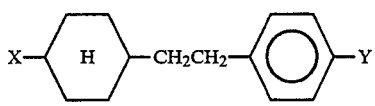

(15) 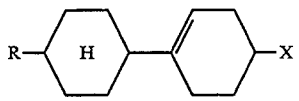

(16) 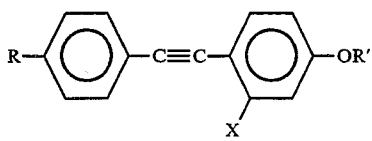

(17) 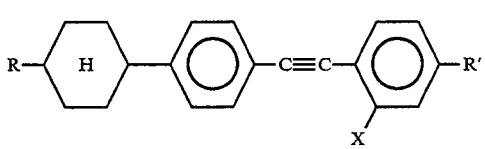

(18) 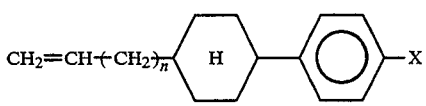

(19) 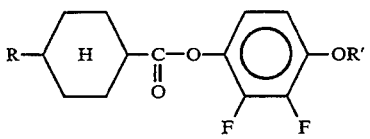

(20) 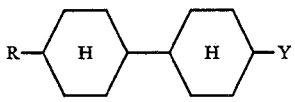

(21) 

(22) 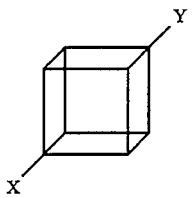

(23) 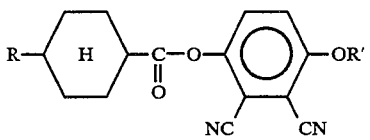

-continued

(24) 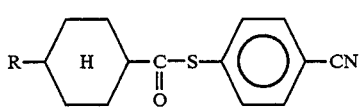

(25) 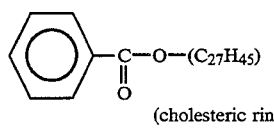

(cholesteric ring)

In the above, (3) is azo type liquid crystal, (4) azoxy type, (5) a phenyl benzoate type, (6) cyanobiphenyl type, (7) cyanoterphenyl type, (8) cyclohexanecarboxylphenyl ester type, (9) phenylcyclohexane type, (10) biphenylcyclohexane type, (11) phenylpyrimidine type, (12) phenyldioxane type, (13) cyclohexyl cyclohexanoate type, (14) cyclohexylethane type, (15) cyclohexane type, (16) aklylalkoxytolan type, (17) alkylcyclohexylalkoxytolan type, (18) alkenyl type, (19) 2,3-difluorophenylene type, (20) cyclohexylcyclohexane type, (21) bicyclooctane type, (22) cubane type, (23) dicyanohydroquinone type, (24) cyanothiophenyl ester type liquid crystal, and (25) is cholesteric type. In the above formulae, X, Y, R and R' are the same as X, Y, R and R' in the formulae (1) and (2).

The above liquid crystal substances may be used alone or in combination. Preferably, various types of liquid crystal substances are mixed and used to obtain higher electroviscous property.

These liquid crystal substances have fluidity at normal temperature and have excellent electroviscous effect. There is no problem of precipitation of solid particles as in the conventional type electroviscous fluid. Friction wearing to machine parts is low, and good electroviscous effect is obtained.

Among the liquid crystal substances, nematic liquid crystal compounds have fluidity similar to liquid at normal temperature and give high electroviscous effect when used alone or in combination, and no problem of precipitation occurs as in the conventional type electroviscous fluid containing solid particles. Anti-friction anti-wear property is also better than normal type lubricating oil.

Among the nematic liquid crystals, those having the difference $\Delta\epsilon$ between dielectric constant $\epsilon \parallel$ in a direction parallel to molecular axis of liquid crystal and dielectric constant $\epsilon \parallel$ in a direction perpendicular to molecular axis of liquid crystal, i.e. those having $\Delta\epsilon = (\epsilon \parallel) - (\epsilon \perp)$ in positive value, are called p-type nematic liquid crystal. This p-type nematic liquid crystal having positive dielectric anisotropic property has excellent electroviscous effect. The liquid crystal having $\Delta\epsilon > 5$ has higher electroviscous effect. Ferroelectric liquid crystal is also suitable as such liquid crystal substance. Preferably, the ferroelectric liquid crystal has spontaneous polarization of $3 \times 10^{-9}$ C/cm$^2$ or more. These are, for example:

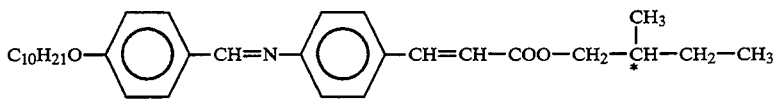

-continued

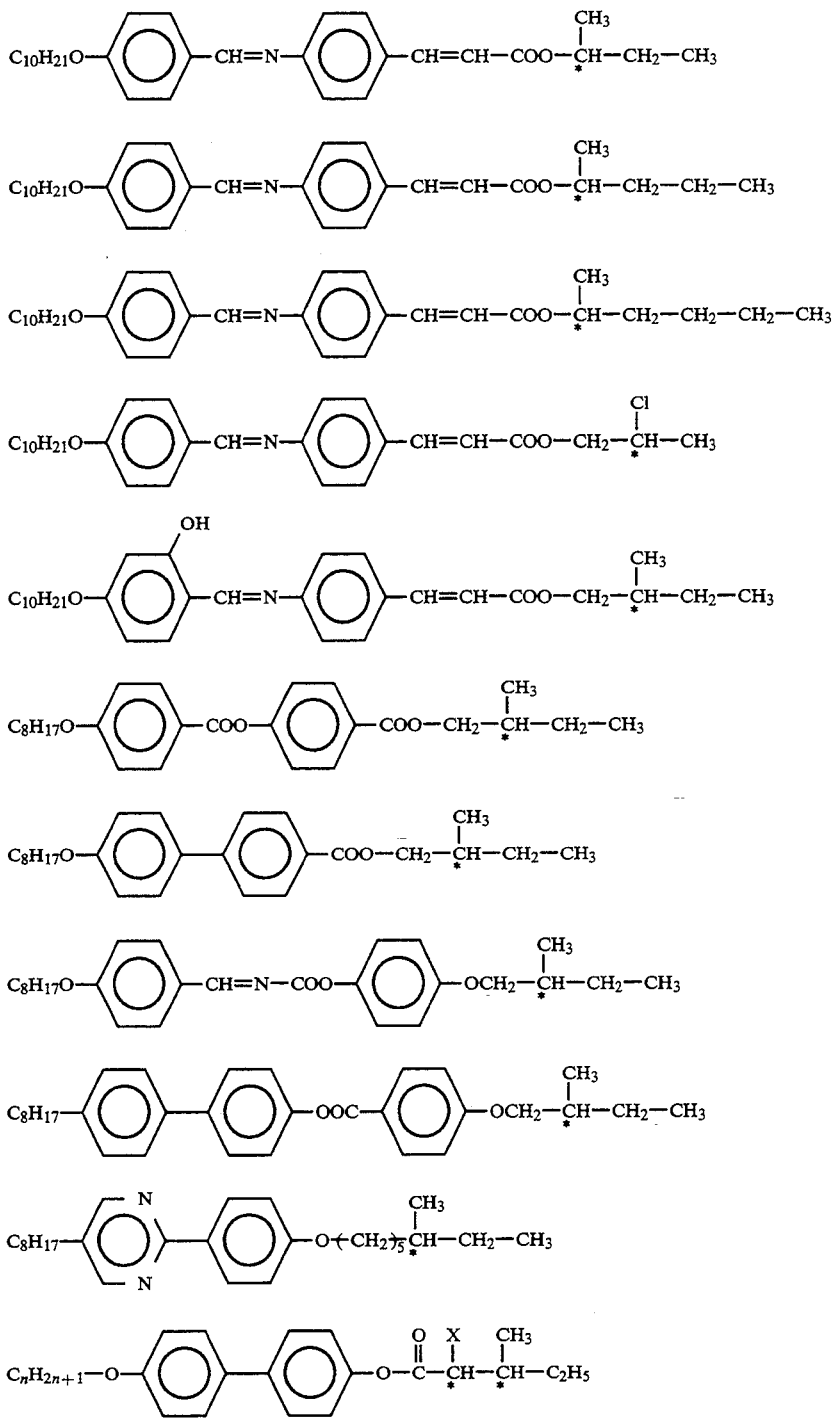

(Note) C represents asymmetric carbon.

As (2S, 3S)-3-methyl-2-halopentanoic acid 4', 4''-alkoxybisphenyl ester, halogen may be chlorine (n=7), or halogen may be chlorine (n=8), or halogen may be chlorine (n=9).

Ferroelectric liquid crystal exhibits fluidity similar to liquid at normal temperature when used alone or in combination and has excellent electroviscous effect. There is no problem of precipitation as in conventional type electroviscous fluid containing solid particles, and antifriction anti-wear property is also better than normal type lubricating oil.

These liquid crystal substances are used alone or in combination. Preferably, various types of liquid crystal substances are mixed and used to have better liquid crystal property. Also, the hemeric liquid crystal as described above may be mixed in the ferroelectric liquid crystal.

Also, the electroviscous fluid may contain liquid crystal or electrically insulating fluid containing the above liquid crystal as dispersion medium and solid particles as diapersold.

There is no specific restriction to the electrically insulating fluid containing liquid crystal. There are, for example, mineral oil and synthetic lubricating oil. More concretely, there are oils such as paraffin type mineral oil, naphthene type mineral oil, poly-α-olefine, polyalkylene glycol, silicone, diester, polyol ester, phosphoric acid ester, silicon compound, fluorine compound, polyphenyl ether, synthetic hydrocarbon, etc. The viscosity range of these electrically insulating fluid is preferably 5 to 300 cSt at 40° C.

Solid particles are used as dispersoid, and porous solid particles such as silica gel, moisture-containing resin, diatomaceous earth, alumina, silica-alumina, zeolite, ion exchange resin, cellulose, etc. may be used. Also, liquid crystal polymer may be used as dispersoid. These solid particles are preferably 10 nm to 200 μm in particle size and are used by 0.1 to 50 weight %. If it is less than 0.1 weight %, electroviscous effect is too low. If exceeds 50 weight %, dispersion property is too low.

To disperse solid particles in the electrically insulating fluid in uniform and stable manner, dispersing agent may be added. Dispersing agent commonly used is normally adopted. For example, sulfonate, phenate, phosphonate, succinimide, amines, and non-ionic dispersing 0 agents are used. More concretely, there are magnesium sulfonate, calcium sulfonate, calcium phosphonate, poly butenyl succinimide, sorbitan monooleate, sorbitan sesquioleate, etc. These are normally used by 0.1 to 10 weight % and may not be used if dispersion property of solid particle is high.

The liquid crystal substance in the dispersion medium of the present invention has polarizing effect under the presence of electric field, and polyhydric alcohol may be added when necessary. As the polyhydric alcohol, dihydric alcohol and trihydric alcohol are preferable, and ethylene glycol, diethylene glycol, triethylene glycol, tetraethylene glycol, polyethylene glycol, glycerine, propanediol, butanediol, pentanediol, hexanediol, etc. may be used.

Partial derivative of polyhydric alcohol may be used. As such derivative, there are partial derivative of polyhydric alcohol having at least one hydroxyl group, partial ethers, in which some of terminal hydroxyl groups of the above polyhydric alcohol are substituted by methyl group, ethyl group, propyl group, alkyl-substituted phenyl group (the number of carbons of alkyl group substituted with phenyl group is 1 to 25.), or partial esters, in which some of terminal hydroxyl groups are esterized by acetic acid, propionic acid, butyric acid, etc.

It is preferable to use such polyhydric alcohol or its partial derivative by 1 to 100 weight %, or more preferably by 2 to 80 weight %. If the added quantity is 1 weight % or less, ER effect is low. If it exceeds 100 weight %, it is not desirable because electric current easily flows. It is needless to say that water may be used together with the polyhydric alcohol in such a degree as not to hinder ER effect.

Further, acid, salt or basic component may be added as 5 necessary. As such acid component, inorganic acid such as sulfuric acid, hydrochloric acid, nitric acid, perchloric acid, chromic acid, phosphoric acid, boric acid, etc. or organic acid such as acetic acid, formic acid, propionic acid, butyric acid, isobutyric acid, valerianic acid, oxalic acid, malonic acid, etc. may be used.

As salt, a compound comprising metal or basic radical (such as $NH_4^+$, $N_2H_5^+$) and acid radical can be used. Above all, it is preferable to use the compound, which is dissolved and dissociated in a system of polyhydric alcohol or partial derivative of polyhydric alcohol, e.g. the compound to form typical ionic crystal such as halide of alkali metal or alkali earth metal, or alkali metal salt of organic acid. As the salt of this type, there are LiCl. NaCl, KCl, $MgCl_2$, $CaCl_2$, $BaCl_2$, LiBr, NaBr, KBr, $MgBr_2$, LiI, NaI, KI, $AgNO_3$, $Ca(NO_3)_2$, $NaNO_2$, $NH_4NO_3$, $K_2SO_4$, $Na_2SO_4$, $NaHSO_4$, $(NH_4)_2SO_4$, or metal salt of alkali acid such as formic acid, acetic acid, oxalic acid, succinic acid, etc.

As base, hydroxide of alkali metal or alkali earth metal, carbonate of alkali metal, amines, etc. are used, and it is preferable to use the compound, which is dissolved and dissociated in a polyhydric alcohol, partial derivative of polyhydric alcohol or in a system of polyhydric alcohol and/or partial derivative of polyhydric alcohol and water. As the base of this type, there are NaOH, KOH, $Ca(OH)_2$, $Na_2CO_3$, $NaHCO_3$, $K_3PO_4$, $Na_3PO_4$, aniline, alkylamine, ethanolamine, etc., and the salt and the base as described above may be used together.

Acid, salt and base are to increase polarizing effect. When used in combination with polyhydric alcohol and/or partial derivative of polyhydric alcohol, the polarizing effect can be increased more, and these substances may be used by 0.01 to 5 weight % to the entire electroviscous fluid. If it is less than 0.01 weight %, ER effect is too low. If it exceeds 5 weight %, it is not desirable because electric current easily flows and power consumption increases. When acid, salt or base component is added to the electroviscous fluid of the present invention, it is necessary that partially esterized compound of polyhydric alcohol alkohol is not hydrolyzed.

It is preferable to add antioxidant and corrosion inhibitor to the electroviscous fluid of the present invention.

As the antioxidant, phenol type or amine type antioxidant commonly used may be used. More concretely, phenol type antioxidant such as 2,6-di-t-butylparacresol, 4,4'-methylene-bis-(2,6-di-t-butylphenol), 2,6-di-t-butylphenol, or amine type antioxidant such as dioctyldiphenolamine, phenyl-α-naphthylamine, alkyldiphenylamine, N-nitrosodiphenylamine, etc. may be used. Such substance can be added to the electroviscous fluid by 0.01 to 10 weight %, or more preferably by 0.1 to 2.0 weight %. If it is less than 0.01 weight %, there is no antioxidation effect. If it exceeds 10 weight %, problems arise such as hue change, generation of turbidity or sludge, increase of consistency, etc.

As corrosion inhibitor, nitrogen compound such as benzotriazole and its derivative, imidazoline, pyrimidine derivative, etc. and the compound containing sulfur and nitrogen such as 1,3,4-thiadiazole polysulfide, 3,4-thiadiazoril-2,5-bisdialkyldithiocarbamate, 2-(alkyldithio)-benzoimidazole, etc., or β-(o-carboxybenzyrthio)propionnitrile or propionic acid may be used. Such substance is used by 0.001 to 10 weight %, or more preferably by 0.01 to 1.0 weight %, to the entire electroviscous fluid. If it is less than 0.001 weight %, there is no corrosion inhibitive effect. If it exceeds 10 weight %, problems arise such as hue change, generation of turbidity or sludge, increase of consistency, etc.

Further, anti-friction anti-wear agents commonly used such as dibenzyl sulfide, dibutyl sulfide, chlorinated paraffin, chlorinated diphenyl, etc. may be added, or extreme pressure agent, defoaming agent, etc. may be added.

In the following, description will be given on several examples of the present invention:

[Example 1]

A mixture of liquid crystal substances given by the following structural formulae and contents, being in liquid 0 state at normal temperature [viscosity 50 cP (20° C)] was used an electroviscous fluid.

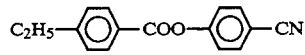 5 wt %

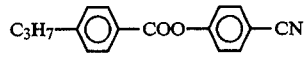 5 wt %

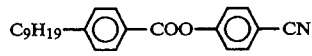 5 wt %

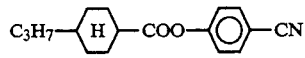 5 wt %

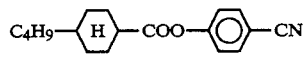 5 wt %

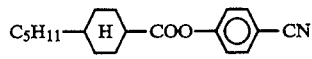 5 wt %

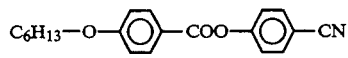 5 wt %

 7 wt %

 7 wt %

 7 wt %

 7 wt %

 7 wt %

 3 wt %

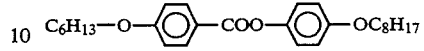 3 wt %

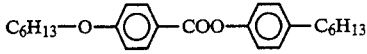 3 wt %

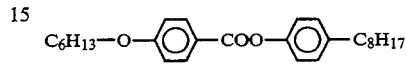 3 wt %

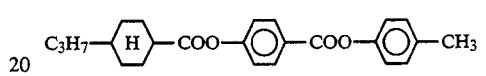 3 wt %

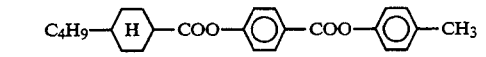 3 wt %

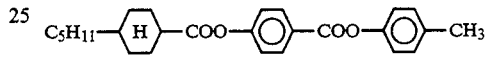 3 wt %

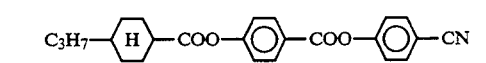 3 wt %

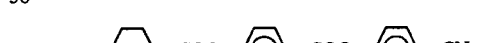 3 wt %

[Example 2]

A mixture of liquid crystal substances given by the following structural formulae and contents, being in liquid state at normal temperature [viscosity 56 cP (20° C.)], was used as electroviscous fluid.

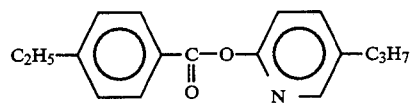 10 wt %

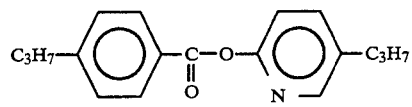 15 wt %

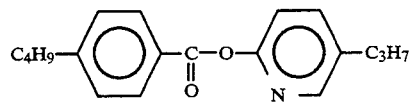 15 wt %

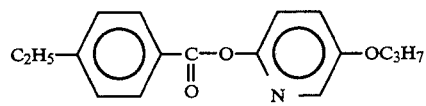 10 wt %

-continued

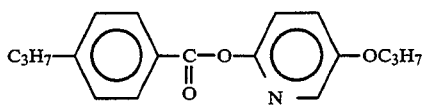 10 wt %

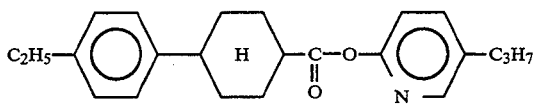 10 wt %

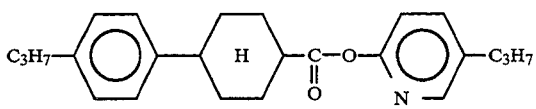 10 wt %

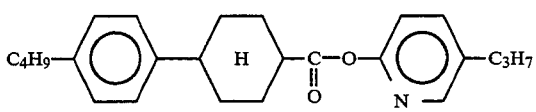 10 wt %

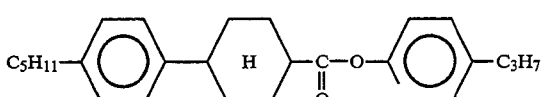 10 wt %

[Example 3]

A mixture of liquid crystal substances given by the following structural formulae and contents, being in liquid state at normal temperature [viscosity 40 cP (20° C.)], was used as electroviscous fluid.

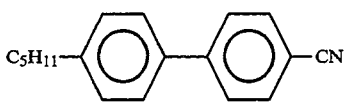

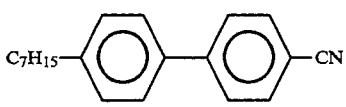

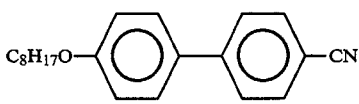

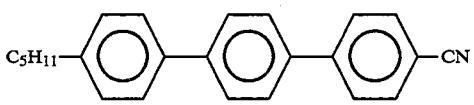

The contents are 51 wt %, 25 wt %, 16 wt % and 8 wt in this order from above.

[Comparative example 1]

4'-methoxybenzylidene-4-n-butylaniline having azomethine bonding was used as electroviscous fluid.

[Comparative example 2]

A liquid crystal substance [trade name: ROTN 200, manufactured by Roche; viscosity 84 cP (20° C.)] containing 4'-propylbenzylidene-4-cyanoaniline by 33 weight %, 4'-hexylbenzylidene-4-cyanoaniline by 67 weight % was used as electroviscous fluid.

[Comparative example 3]

Monochlorobenzene, a polar substance, was used as electroviscous fluid.

Each of the electroviscous fluids given above was used immediately after opening the sample and also after leaving it in the atmospheric air for 10 days. Using a voltage-applicable rotational viscometer, thickening effect was determined at 40° C. to evaluate as electroviscous fluid.

Thickening effect was compared by ratio of viscosity at AC electric field of $2.0 \times 10^6$ (V/m) to viscosity at electric field of 0 (V/m) when shear rate was 600 sec.$^{-1}$.

The results are given in Table 1.

TABLE I

|  | Thickening effect | |
| --- | --- | --- |
|  | Immediately after opening sample | After leaving in the air for 10 days |
| Example 1 | 3.9 | 3.9 |
| Example 2 | 4.5 | 4.5 |
| Example 3 | 5.1 | 5.0 |
| Comparative example 1 | 2.0 | 1.5 |
| Comparative example 2 | 3.1 | 2.3 |
| Comparative example 3 | 1.1 | 1.1 |

It is evident that each of the electroviscous fluids of the present invention is more stable when brought into contact with atmospheric air and has higher thickening effect than the comparative examples.

[Example 4]

An electroviscous fluid was prepared, which contains nematic liquid crystal [trade name: NEM 133 (N), manufactured by Fuji Pigment Co.; viscosity 50 cP (20° C.)] by 99.7 weight % and 2,6-di-t-butylphenol by 0.3 weight %.

[Example 5]

An electroviscous fluid was prepared, which contains nematic liquid crystal [trade name: NEM 133 (N), manufactured by Fuji Pigment Co.; viscosity 50 cP (20° C.)] by 99.9 weight % and benzotriazole derivative as metal corrosion inhibitor by 01 weight %.

[Example 6]

An electroviscous fluid was prepared, which contains nematic liquid crystal [trade name: NEM 133 (N), manufactured by Fuji Pigment Co.; viscosity 50 cP (20° C.)] by 99.6 weight %, 2,6-di-t-butylphenol by 0.3 weight %, and benzotriazole derivative by 0.1 weight %.

[Example 7]

An electroviscous fluid was prepared, which contains nematic liquid crystal [trade name: NEM 133 (N), manufactured by Fuji Pigment Co.; viscosity 50 cP (20° C.)] by 99.6 weight %, dioctyldiphenylamine by 0.3 weight %, and benzotriazole derivative by 0.1 weight %.

[Example 8]

Nematic liquid crystal [trade name: NEM 133 (N), manufactured by Fuji Pigment Co.; viscosity 50 cP (20° C.)] was used as electroviscous fluid.

On each of the above samples, thickening effect and durability were determined at 40° C. using a voltage-applicable rotational viscometer to evaluate as electroviscous fluid.

Thickening effect was compared by ratio of viscosity at AC electric field of $2.0 \times 10^6$ (V/m) to viscosity at electric field of 0 (V/m) when shear rate was 600 sec.$^{-1}$.

Durability is expressed by the ratio of viscosity coefficient at 12 hours after measurement to initial viscosity coefficient. The results are summarized in Table 2.

Electric current value is the value measured under the above conditions.

TABLE 2

| | Thickening effect (X) | Durability (%) | Current value ($\mu$A/cm$^2$) |
|---|---|---|---|
| Example 4 | 3.9 | 100 | 1.8 |
| Example 5 | 3.9 | 100 | 0.5 |
| Example 6 | 3.9 | 97 | 0.3 |
| Example 7 | 3.9 | 100 | 0.5 |
| Example 8 | 3.9 | 95 | 2.0 |

It is evident from the table that each of the electroviscous fluids of Examples 4-7 has higher durability and requires less electric current compared with Example 8, which contains only nematic liquid crystal.

[Example 9]

Nematic liquid crystal [trade name: RDX-4069, manufactured by Rodick; $\Delta\epsilon=20.0$; viscosity 56 cP (20° C.)] was used as electroviscous fluid.

[Example 10]

Nematic liquid crystal [trade name: DOX-2058, manufactured by Rodick; $\Delta\epsilon=14.6$, viscosity 53.7 cP (20° C.)] was used as electroviscous fluid.

[Example 11]

Nematic liquid crystal [trade name: DOX-7005, manufactured by Rodick; $\Delta\epsilon=6.3$, viscosity 23.2 cP (20° C.)] was used as electroviscous fluid.

[Example 12]

Nematic liquid crystal 4'-methoxybenzylidene-4-n-butylaniline (MBBA, $\Delta\epsilon=-0.7$, viscosity 35 cP (20° C.)) was used as electroviscous fluid.

[Example 13]

A liquid crystal mixture containing nematic liquid crystals having the following structural formulae $-1.3$, viscosity 18 cP (20° C.)] was used as electroviscous fluid:

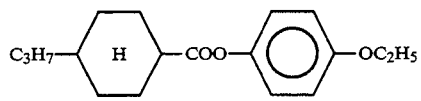

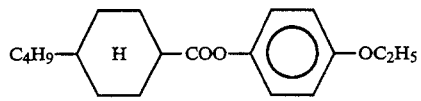

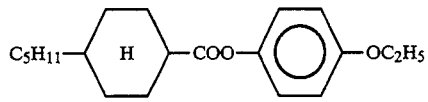

On each of the above samples, thickening effect was determined at 40° C. using a voltage-applicable rotational viscometer to evaluate as electroviscous fluid.

Thickening effect was compared by ratio of viscosity at AC electric field of $2.0 \times 10^6$ (V/m) to viscosity at electric field of 0 (V/m) when shear rate was 600 sec.$^{-1}$. The results are given in Table 3.

TABLE 3

| | Thickening effect (X) |
|---|---|
| Example 8 | 3.9 |
| Example 9 | 4.5 |
| Example 10 | 5.5 |
| Example 11 | 4.8 |
| Example 12 | 2.0 |
| Example 13 | 1.8 |

It is evident that each of the electroviscous fluids of Examples 8–11 has higher thickening effect than Examples 2 and 13.

Example 14]

Ferroelectric liquid crystal (2S,3S)-3-methyl-2-chloropentanoic acid 4',4"-octyloxybiphenyl ester (magnitude of spontaneous polarization: $1.8 \times 10^{-7}$ C/cm$^2$) was used as electroviscous fluid.

[Example 15]

To nematic liquid crystal [trade name: NEM 133 (N), manufactured by Fuji Pigment Co.; viscosity 50 cP (20° C.)], ferroelectric liquid crystal (2S,3S)-3-methyl-2-chloropentanoic acid 4',4"-octyloxybiphenyl ester (magnitude of spontaneous polarization: $1.8 \times 10^{-7}$ C/cm$^2$, 40° C.) was added by 20 weight % to prepare electroviscous fluid.

On each of the above samples, thickening effect was determined at 50° C. using a voltage-applicable rotational viscometer. Thickening effect was compared by ratio of viscosity at AC electric field of $2.0 \times 10^6$ (V/m) to viscosity at electric field of 0 (V/m) when shear rate was 600 sec.$^{-1}$.

To measure responsiveness of each sample, a measuring apparatus was prepared, which comprises a piston and a cylinder having a flow passage of electroviscous fluid and in which voltage is applicable between the piston and the cylinder. After each sample was filled in the cylinder, the piston was dropped by its own weight at 50° C. while electric field was being turned on and off, and the response time (msec) was measured. The results are shown in Table 4.

TABLE 4

|  | Thickening effect (X) | Response time (msec) |
|---|---|---|
| Example 8 | 3.9 | 25 |
| Example 14 | 4.5 | 0.1 |
| Example 15 | 4.5 | 0.5 |

It is evident that each of the electroviscous fluids of Examples 14 and 15 has higher thickening effect and responsiveness than Example 8, which contains only nematic liquid crystal.

[Example 16]

An electroviscous fluid [viscosity 42 cSt (40° C.)] having the following composition was prepared:

| (1) Nematic liquid crystal (manufactured by Fuji Pigment Co.) (viscosity 21 cSt (40° C.)) | 85.0 weight parts |
|---|---|
| (2) Silica gel | 6.0 weight parts |
| (3) Triethylene glycol | 2.0 weight parts |
| (4) Alkenyl succimide (trade name: ASA-168P-TEPA; manufactured by Toho Chemical Co.) | 7.0 weight parts |

[Example 17]

An electroviscous fluid [viscosity 46 cSt (4° C.)] having the following composition was prepared:

| (1) Alkylbenzene (viscosity 25 cSt) | 44.7 weight parts |
|---|---|
| (2) Nematic liquid crystal (manufactured by Fuji Pigment Co.; viscosity 21 cSt (40° C.)) | 40.0 weight parts |
| (3) Silica gel | 6.0 weight parts |
| (4) Triethylene glycol | 2.0 weight parts |
| (5) Polyisobutenyl succimide (trade name: ECA4360J; manufactured by Exxon Chemical Co.) | 7.0 weight parts |
| (6) 2,6-di-t-butylphenol (trade name Ethyl 703; manufactured by Ethyl Corporation) | 0.3 weight parts |

[Comparative example 4]

An electroviscous fluid [viscosity 40 cgt (40° C.)] having the following composition was prepared:

| (1) Alkylbenzene (viscosity 25 cSt) | 84.7 weight parts |
|---|---|
| (2) Silica gel | 6.0 weight parts |
| (3) Triethylene glycol | 2.0 weight parts |
| (4) Polyisobutenyl succimide (trade name: ECA4360J; manufactured by Exxon Chemical Co.) | 7.0 weight parts |
| (5) 2,6-di-t-butylphenol (trade name Ethyl 703; manufactured by Ethyl Corporation) | 0.3 weight parts |

[Example 18]

Nematic liquid crystal [viscosity 2] cst (40° C.)] (manufactured by Fuji Pigment Co.) was used alone as electroviscous fluid.

On each of the electroviscous fluids prepared above, thickening effect was determined at 0° C. and 40° C. using a voltage-applicable rotational viscometer to evaluate as electroviscous fluid.

Thickening effect was evaluated by ratio of viscosity at AC electric field of $2.0 \times 10^6$ (V/m) to viscosity at electric field of 0 (V/m).

The results are shown in Table 5.

TABLE 5

|  |  | Thickening effect (X) |
|---|---|---|
| Example 16 | 0° C. | 4.6 |
|  | 40° C. | 8.5 |
| Example 17 | 0° C. | 3.3 |
|  | 40° C. | 6.1 |
| Comparative example 4 | 0° C. | 1.2 |
|  | 40° C. | 3.8 |
| Example 18 | 0° C. | 3.0 |
|  | 40° C. | 3.9 |

It is evident that each of the electroviscous fluids of Examples 16 and 17 have higher thickening effect at low temperature than comparative example 4 and higher thickening effect at high temperature than Example 18.

INDUSTRIAL APPLICABILITY

The substance according to the present invention is useful as electroviscous fluid to be used for electric control of vibration control machines and devices such as variable damper, engine mount, bearing damper, clutch, valve, shock absorber, precision machine, acoustic machine, etc. or for display element.

What is claimed is:

1. An electroviscous fluid, comprising ferroelectric liquid crystals with no azomethine bonding that have spontaneous polarization of $3 \times 10^{-9}$ C/cm$^2$ or more.

2. An electroviscous fluid as claimed in claim 1, further comprising at least one of an antioxidant and a metal corrosion inhibitor in an amount of 0.01 to 10 weight %.

3. An electroviscous fluid as claimed in claim 1, further comprising solid particles and electrically insulating fluid.

4. An electroviscous fluid as claimed in claim 2, further comprising solid particles and electrically insulating fluid.

5. An electroviscous fluid as claimed in claim 3, comprising 0.1 to 50 weight % solid particles and 0.01 to 10 weight % of at least one of an antioxidant and a metal corrosion inhibitor.

6. An electroviscous fluid as claimed in claim 4, comprising 0.1 to 50 weight % solid particles and 0.01 to 10 weight % of at least one of the antioxidant and the metal corrosion inhibitor.

* * * * *